Oct. 1, 1935.   C. B. NELSON   2,015,811
TOASTER
Filed Aug. 8, 1934   3 Sheets-Sheet 2
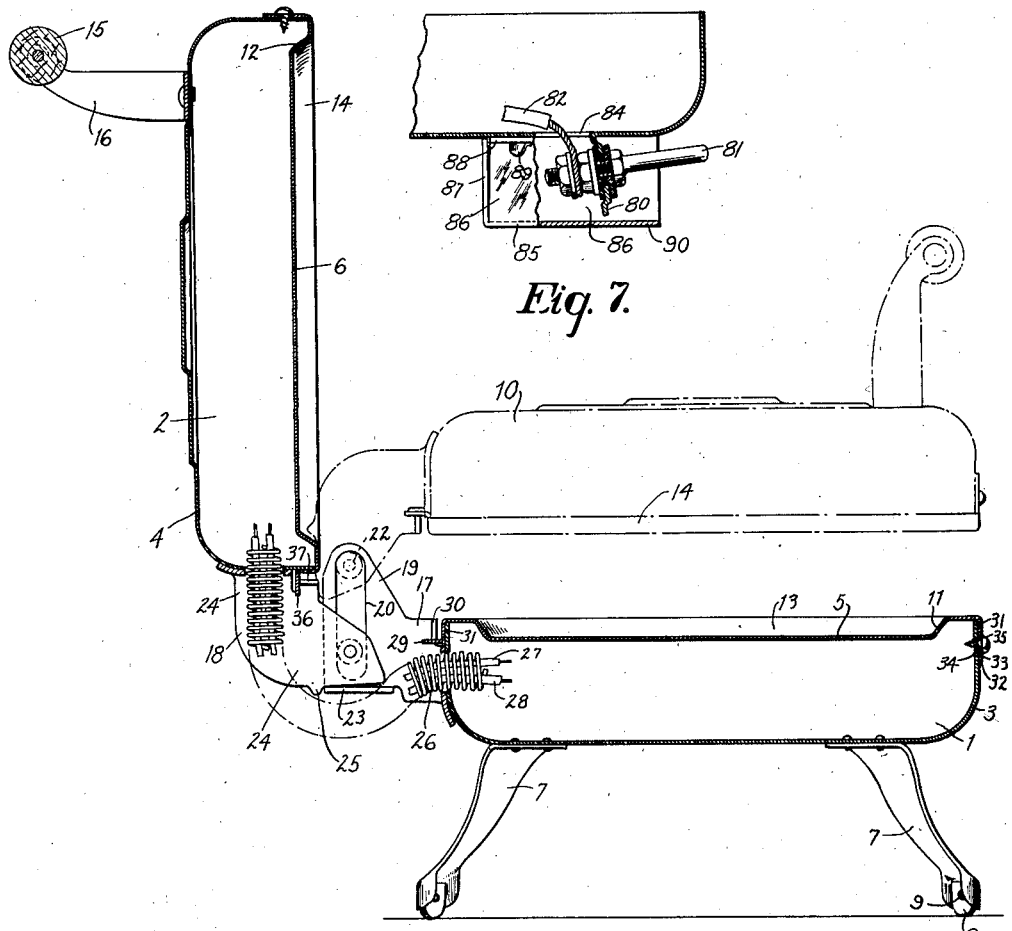
Fig. 7.
Fig. 2.
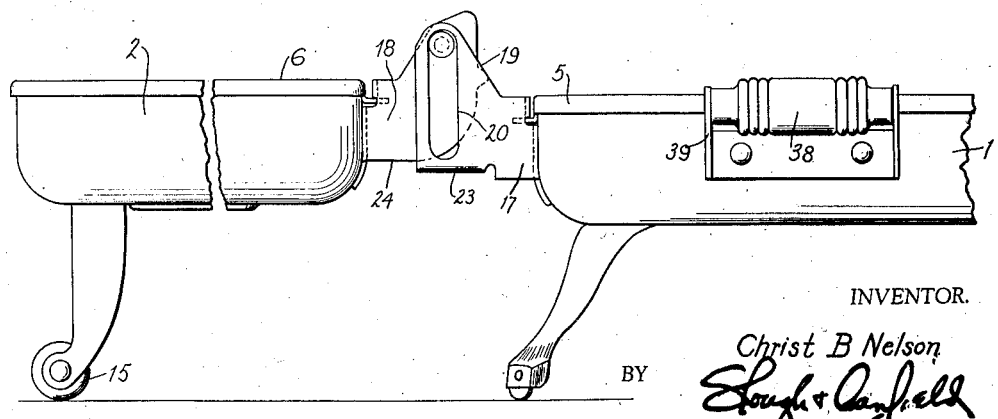
Fig. 3.
INVENTOR.
Christ B Nelson
BY
His ATTORNEYs.

Oct. 1, 1935.                    C. B. NELSON                    2,015,811
                                    TOASTER
                            Filed Aug. 8, 1934          3 Sheets-Sheet 3

INVENTOR.
Christ B. Nelson.
BY
His ATTORNEYs.

Patented Oct. 1, 1935

2,015,811

UNITED STATES PATENT OFFICE 2,015,811

TOASTER

Christ B. Nelson, Cleveland, Ohio

Application August 8, 1934, Serial No. 738,992

7 Claims. (Cl. 219—19)

My invention relates to improvements in electrical toasters and grills and particularly to electrical toasters and grills which are adapted for household use.

In prior toasters and grills of electrical types wherein the heating of the toasting and grilling surface is accomplished by the thermal effects of an electrical current, usually the electrical current is caused to traverse a heating element which in prior devices has taken many different forms and very commonly has been in the form of a resistor wire usually of flattened ribbon form wound about a relatively thin sheet of mica, asbestos board, or the like. The heating element so constructed is then packed within the heating compartment of the toaster or grill adjacent the toasting or grilling surfaces which may be in the form of a plate, but usually separated therefrom by a sheet of asbestos board or the like.

Heating elements so constructed and disposed are not only less efficient than is desirable, but at the same time the asbestos board or other insulating sheet material employed, is subject to deterioration.

Furthermore, the construction and arrangement of the parts of grills and toasters of the class referred to have heretofore been complicated, rendering the devices expensive to manufacture and assemble, thus making them unduly expensive to the user and restricting their distribution and use. Particularly is this true of those parts providing the hinge construction common in toasting and grilling devices employing a plurality of heating surfaces, and of those parts whereby access may be had to the heating elements.

An object of my invention therefore is to provide an improved electrical grill or toaster device and an improved heating unit therefor disposed therein in a highly improved manner, and which will be susceptible of ready assembly into the device or removal therefrom, being also highly efficient in use and relatively inexpensive to produce and install.

Other objects of my invention involve the construction of the improved toaster or grill and the construction and assembly of the various parts, which altogether are comprised in the improved device of my invention and will be apparent from the following description of an embodiment of my invention, and the accompanying drawings illustrating the same, in which:

Fig. 2 is a cross-sectional view taken from the plane 2—2 of Fig. 1 and with some of the parts behind the sectional plane omitted to simplify the drawing;

Fig. 3 is a fragmentary elevational view taken from the plane 3—3 of Fig. 1 but with parts thereof in different operative positions;

Fig. 7 is a fragmentary sectional view taken approximately from the plane 7—7 of Fig. 1;

Figure 1:
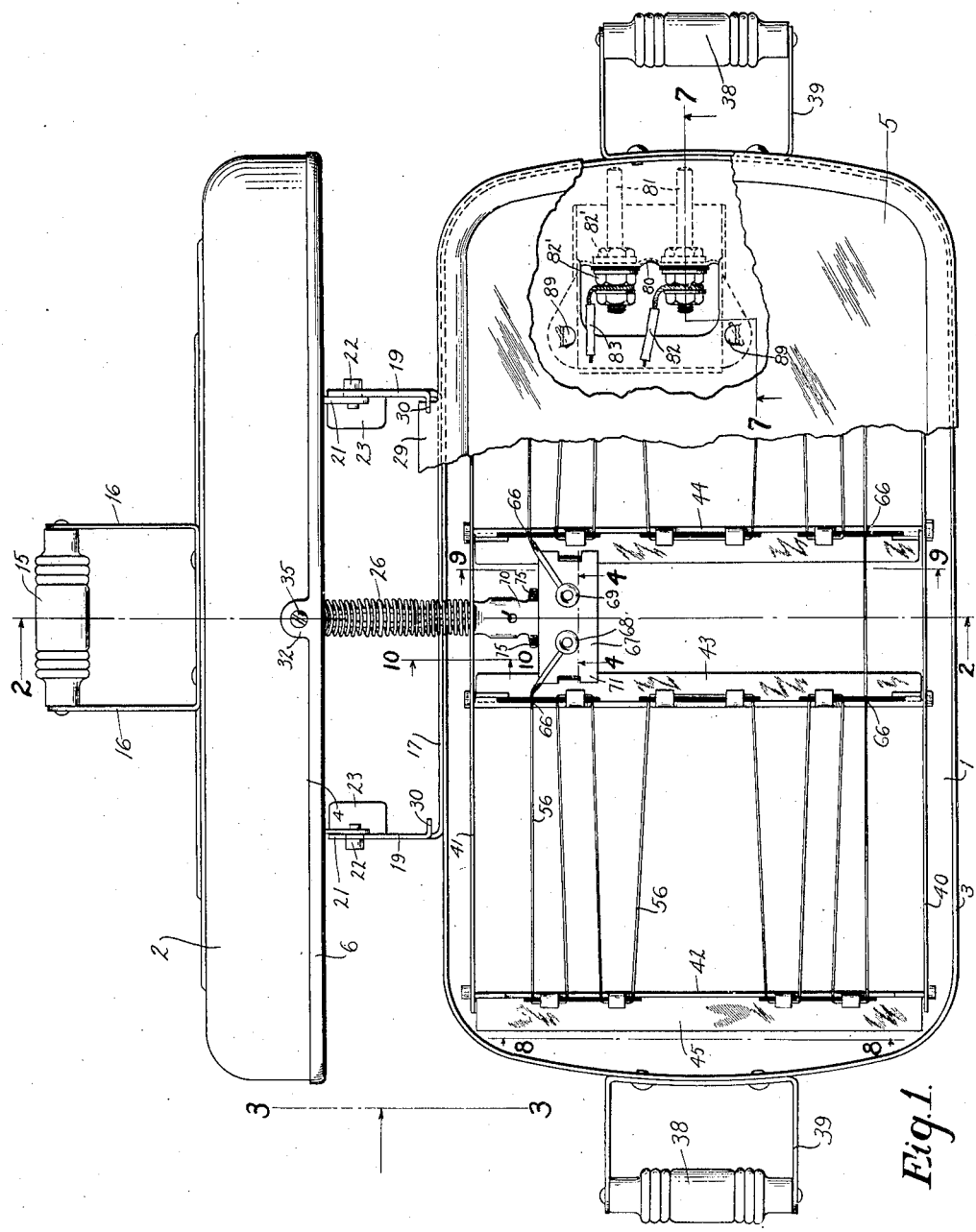
Fig. 1 is a top plan view of an embodiment of my invention with parts thereof in one position which they may assume in operation and with parts broken away for clearness.

Referring to the drawings, particularly Figs. 1, 2, and 3, I have designated generally by the characters 1 and 2, respectively, stationary and movable sheet metal housings comprising respectively pan-form elements 3 and 4 and covers respectively 5 and 6. The stationary housing 1 is provided with a plurality of legs, such as four, 7—7, secured upon the bottom wall thereof, extending outwardly downwardly therefrom and terminating in feet 8—8 which are preferably made from fiber stamping and riveted to the sheet metal legs as at 9. The stationary housing therefore may stand upon a table or the like and the fiber feet will prevent scratching or otherwise marring the table surface.

The movable housing 2 is connected to the stationary housing 1 by a hinge construction, to be described, whereby it may be disposed generally vertically and laterally of the housing 1, or may be rocked to the position illustrated generally at 10 in broken lines, above the housing 1 at a variable height thereabove, or may be rocked outwardly downwardly to a horizontal position as shown in Fig. 3 and suspended above the supporting table by the nature of its attachment to the housing 1.

The covers 5 and 6 comprise elevated rim portions 11 and 12 and depress shallow recesses 13 and 14, and heating elements to be described are enclosed within the covered housings and the heat thereof transmitted to the covers 5 and 6.

Thus in operation, the movable housing may be placed in the position of Fig. 2 and food such as toast or the like to be toasted or grilled may be laid in the recess 13 on the pan cover 5 and then the housing 2 may be rotated over into the broken line position 10 and may rest by gravity, due to the hinge construction to be described, upon the upper side of the food. The heat generated within the two housings will toast or otherwise cook the food between the pan covers. After cooking is completed, the movable housing 2 may be removed either to the position of Fig. 2 or that of Fig. 3, and the food may be kept warm upon either or both of the covers.

If desired, both the housings may first be placed in the position of Fig. 3 and food placed on both pan covers 5 and 6 and cooked separately thereon. Also, pans or other utensils may be placed upon the covers 5 and 6 or in the recesses 13 and 14 thereof and food therein may be cooked. A non-heat-conducting handle 15 is secured by arms 16 to the bottom of the pan 4 by which it may be rocked from one position to another; and if desired, when the housing 2 is rocked into the position of Fig. 3, the handle 15 may rest upon the table top or like support to support the housing 2.

The hinge construction above referred to comprises a pair of generally U-form sheet metal stampings 17 and 18 secured by their closed end portion to the adjacent sides of the pan-form elements 3 and 4 and with the legs of one element overlapping those of the other. The legs 19—19 of the element 17 have generally vertical slots 20 therein and the legs 21—21 are provided with coaxial outwardly axially extending trunnions 22—22 in the slots to guide the movement of the pan 4.

The legs 19 have inwardly extending confronting shelves 23—23 formed thereon generally in a horizontal plane. When the two pans 3 and 4 are in the positions of Fig. 3, suitably disposed portions or edges 24 on the leg 18 may rest upon the shelves 23—23 with the trunnions 22—22 in the upper extreme ends of the slots 20 and the tendency of the pan 2 to rock downwardly on the edge of the shelf 23 is stopped by the trunnion 22 in the end of the slots and thus the pan 2 is supported by the hinge connection upon the pan 1. If, as above stated, it be desired to support the pan 2 on the handle 15 as a leg, the last described coaction of parts need not be provided.

When the pan 4 is placed in the position of Fig. 2, a projection 25 on the leg 18 may engage the shelf 23 at a point toward the left, as viewed in the drawings, of the vertical line of the slot 20. The tendency of the pan 4 to rock counter-clockwise as viewed in the drawings upon the shelf 23 is stopped by the trunnion 22 which is thereby caused to jam against or engage the edge of the slot 20 and thereby the pan 4 may be supported in the illustrated vertical position of Fig. 2. When the pan 4 is rocked over into the broken line position 10 of Fig. 2, the trunnion 22 simply floats up and down in the slot 20 to accommodate its position to the thickness of the toast or like food on the pan cover 13 to permit the cover 14 to rest upon the upper side of the food.

A flexible, preferably metal, cable housing 26 extends into each of the pans 3 and 4 to house and protect insulated electric wires 27 and 28 connected to heaters or heating units in each of the pans 3 and 4 respectively, not illustrated in Fig. 2 but illustrated and described in connection with Fig. 1, and the cable housing 26 is flexible whereby the electric connection may be maintained and protected during hinging movement of the two housings 1 and 2 relative to each other as above described. The cable 26 may be made of any suitable material but I prefer to employ simply a wire wound in the form of a helical spring and in a manner to be described the free ends of the wire are utilized to anchor the cable at its ends.

To secure the pan covers 5 and 6 on the pans 3 and 4, the edge of the cover 5 adjacent the hinge construction is provided with a laterally extending flange 29 and the leg 19 of the U-shaped element 17 is provided with a pair of inwardly extending confronting lugs 30—30. In assembling the cover 5 on the pan 3, it is first disposed in a generally vertical position and the flange 29 is hooked under the lugs 30—30 and the cover is then rocked around clockwise as viewed in Fig. 2 into position on the pan 3. The cover has a peripheral flange 31 which snugly fits the open mouth of the pan 3 all around the same, and on the side of the cover opposite the flange 29, a tongue 32 is provided having a perforation 33 alignable with a corresponding perforation 34 in the pan wall, and a common wood screw 35 is screwed into the two aligned perforations, cutting its own threads in the perforation 34 to finally secure the cover 5 on the pan 3.

A similar construction is provided for the pan 4 involving a flange 36 on the cover 6 and a lug 37 on the leg 24 of the U-shaped element 18.

To transport the pan housings thus constructed, a pair of handles 38—38 may be provided at opposite ends of the pan 3 supported by outwardly extending legs or brackets 39—39 secured to the ends of the pans. An electric heating unit is housed in each of the pans 3 and 4. Identical units are preferably employed connected by wires 27 and 28 running through the cable housing 26, connecting them preferably in series. A plug connector to be described in connection with Figs. 1 and 2 is provided only in the pan 3 to energize both heaters, and these heaters and the plug connection will now be described.

Figure 6:
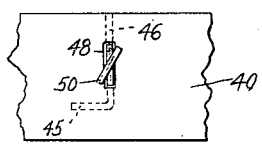
Fig. 6 is a fragmentary view taken from the plane 6—6 of Fig. 5.
Figure 5:
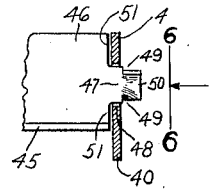
Fig. 5 is a fragmentary view of a part of Fig. 1 drawn to a larger scale.

A main frame is provided comprising parallel spaced sheet metal side bars 40 and 41 and transverse bars 42—42 connecting the side bars 40 and 41 (only one of which is shown, the other being concealed in Fig. 1 under the cover 5) and intermediate transverse bars 43 and 44 connecting the side bars 40 and 41. To effect junction of the transverse bars to the side bars at the minimum of expense and with the fewest parts, the connection is made as illustrated in Figs. 1, 5, and 6. The transverse bars are generally of angle cross-section with the legs of the angle disposed horizontally and vertically, as at 45 and 46. The vertical leg 46 has a tongue 47 extending from the end thereof into a perforation 48 in the side bar 40, the perforation substantially fitting the tongue, to prevent rotation of the angle-form bar relative to the side bar 40. The tongue 47 extends through and beyond the perforation 48 and is partly severed by transverse cuts at 49—49. After the tongue 47 is projected through the perforation 48, the partly severed extension 50 is grasped between the jaws of a pair of pliers and twisted so that lateral portions thereof overlap the perforation as shown in Fig. 6 to prevent withdrawal of the tongue 47 from the perforation. The twisted extension 50 may clamp the side bar 40 upon the end shoulders 51—51 of the angle bar, and thus a rigid connection is made between the parts.

Figure 8:
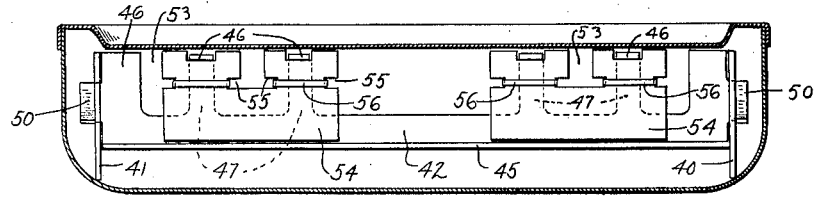
Fig. 8 is a sectional view taken from the plane 8—8 of Fig. 1.

The transverse bars 42—42 in the opposite ends of the pan are illustrated for one bar 42 in Figs. 1 and 8. The vertical leg 46 of the angle-form bar is provided with five notches 53—53 providing four upstanding tongues 47—47 the upper ends of which are bent over toward the observer. Two insulating elements 54—54, preferably formed from sheet mica, stand on the horizontal legs 45 of the angle and have notches in their upper edges into which the bent ends 46 of the tongues 47 extend to position the insulating elements. The insulating elements 54 overlap the notches 53—53 and are provided, for each tongue 47, with a pair of notches 55—55 adapted to receive a tape-form wire of high resistance heating metal 56 as illustrated in Fig. 1, the wire being formed in loops in the pairs of notches 55—55, the wire being tensed in the direction to hold the insulating element 54 against the tongues 47, and the notches 55—55 holding the wire out of contact with the tongues and other parts of the angle bar. Thus the insulation elements 54 support the wire, hold it out of contact with the metal of the transverse bar and is itself retained on the bar by the tension of the wire holding the insulation element against the tongues 47. Thus, by the minimum of parts and assembly operations, the wire 56 is supported and insulated.

Figure 9:
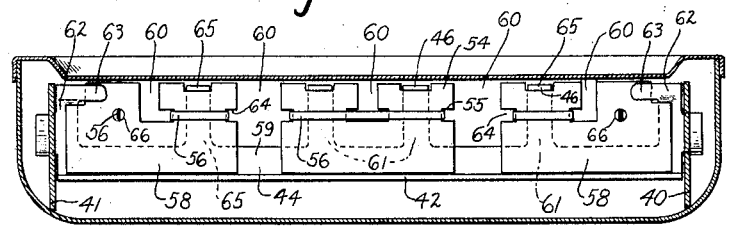
Fig. 9 is a sectional view taken from the plane 9—9 of Fig. 1.

The bar 44, shown in Fig. 9, is constructed similarly to the bar 42 of Fig. 8. In this form, however, three insulating elements are employed, two at the opposite ends and an intermediate element. The intermediate element 54 may be the same as that on the bar 42 of Fig. 8. The end insulating elements 58—58 may be alike for simplicity and cheapness of construction. The vertical flange 59 of the angle 44 is provided with five notches 60—60 providing four tongues 61—61 and the insulator 54 is held against the two intermediate tongues. The outer insulating elements 58—58 each cover the outermost tongue 61 and overlap a portion 62 of the vertical angle flange at the end thereof, and a tongue 63 bent from the portion 62 overlaps an adjacent portion of the insulator 58. Each insulator, in the portion where it overlaps a tongue 61, is provided with a pair of notches 64—64 and the tongues 61 have bent-over end portions 65, these parts being similar to those described in connection with Fig. 8 for the bar 42, and the end insulators 58 having perforations 66 therethrough.

The wire 56 thus may hold the insulators against their tongues and may pass through the perforations 66 in a manner to be described to support and insulate the wire.

Two transverse angles 43 and 44 like that described in connection with Fig. 9 are provided in the intermediate portion of the pan 3, and two transverse bars such as the bar 42 described in connection with Fig. 8 are provided at the opposite end portions of the pan, and all four angle bars are connected at their opposite ends to the side bars 40 by the tongue construction above described in connection with Figs. 5 and 6.

Figure 10:
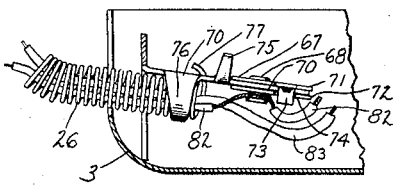
Fig. 10 is a fragmentary elevational view taken from the plane 10—10 of Fig. 1.
Figure 4:
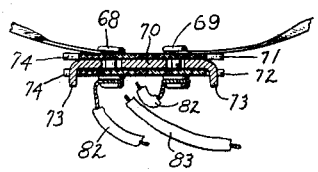
Fig. 4 is a fragmentary sectional view taken from the plane 4—4 of Fig. 1.

A terminal block (to be described) indicated generally at 67, Fig. 1, and illustrated separately in Figs. 4 and 10, has a pair of terminal posts 68 and 69 thereon. One end of the wire 56 above referred to is secured to the post 68 and is passed through one of the holes 66 and then is wound in zig-zag fashion over the insulators on the two transverse bars in one end of the pan 3, thereafter passing through another pair of the holes 66—66 in the insulation elements on the bars 43 and 44, is wound in zig-zag fashion over the opposite end bars in the pan, finally returning through perforation 66 to the terminal post 69.

The terminal block 67 comprises a sheet metal tongue 70 bent out of the adjacent side bar 41 and projecting inwardly of the pan 3. Rectangular insulating elements preferably of mica 71 and 72 are placed on the upper and lower sides thereof. Aligned perforations are provided in the elements 71 and 72 and the tongue 70, the perforations in the tongue 70 being larger than those in the insulating elements. The pair of terminals 68 and 69 in the form of bolts or rivets extends through the aligned perforations, being provided with heads on opposite sides thereof to clamp the elements 71 and 72 on the tongue 70, and the larger perforations in the tongue insulating the tongue from the terminals 68 and 69.

Lugs 73—73 are bent downwardly from the tongue 70 and interlock with corresponding notches 74—74 in the edges of one of the elements 71, 72 to position the insulating elements on the tongue. The insulating elements are further positioned by the upstanding lugs 75—75 on the tongue engaging an edge of the upper insulating element 71.

A pair of downwardly bent ears 76—76 on the tongue 70 embrace the end of the cable housing 26 within the pan 3, and the cable housing 26 being made preferably of wound wire has a terminal end 77 thereof projected upwardly through a suitable perforation in the tongue to anchor the cable housing.

The wires 27 and 28 in the cable housing above described are connected to the terminal elements 68 and 69 as shown in Fig. 10 and Fig. 4.

As above referred to, a heating element and terminal block 67 are provided in the pan-form housing 4 which may be identical with that above described for the pan 3, the terminal block being connected to the other end of the wires 27 and 28. To energize both heating elements, electric current is therefore conducted to the terminal connector 68—69 as will now be described.

Referring to Figs. 1 and 7, a tongue 80 is bent downwardly out of the bottom of the pan 30 and a pair of plug-connectors 81—81 are projected through suitable perforations in the tongue 80, secured thereto and insulated therefrom by bolt elements 82'—82' on opposite sides of the tongue 80 and suitable well known insulating washers and the like interposed therebetween to insulate the plug elements 81 from the tongue 80. Wires 82 and 83 are connected to the bolt elements 82' and to the terminal and to terminal connectors 68 and 69 above described, the wires 82 and 83 passing upwardly through the perforation 84 made by bending the tongue 80 downwardly. The wires 82 and 83 thus may lie upon the bottom of the pan 3 under the heating elements above described.

To enclose the terminal plugs 81, a sheet metal box is provided comprising a bottom 85, sides 86 and an end wall 87, the sides 86—86 having outwardly laterally extending wings 88. Tongues 89—89 are bent downwardly out of the bottom of the pan 3, are projected through suitable perforations in the wings 88—88 and thereafter twisted as by a pair of pliers out of the plane of the tongues thereby clamping the wings 88—88 on the pan bottom to secure the box 90 on the pan in position to enclose the plugs 81 and the tongue 80.

Normally the under side of the pan covers 5 or 6 rests upon the upper edge of the side bars 40 and the upper ends of the tongues on the transverse angle bars to hold the rectangular heating unit above described in position in the pan, thus causing the heating wire 56 to be at all times spaced a predetermined distance from the pan bottom.

My invention is not limited to the exact details of construction shown and described. Many modifications may be made within the scope and spirit of my invention without sacrificing its advantages.

I claim:

1. An electric heating element comprising a rectangular sheet metal frame having a plurality of spaced transverse frame elements, electric insulators on the frame elements and a heating wire wound back and forth from one frame element to the other and looped upon and outwardly around the insulating elements and constituting the sole means for holding the insulating elements against the frame elements and interlocking projection and notch means on each insulating element and a corresponding portion of a frame element to prevent shifting of the insulating element, the wound wire maintaining the insulating element and frame element in interlocked relation.

2. An electric heating unit comprising substantially parallel sheet metal side bars, a plurality of spaced substantially parallel transverse bars connected at opposite end portions to the side bars a plurality of electric insulators on each transverse bar, a heating wire wound back and forth and looped upon and outwardly around the insulating elements of the several transverse bars, each insulating element being held against a bar solely by a loop of the wire, and a projection and notch interlock between each insulating element and a bar preventing lateral shifting thereon of the insulators.

3. An electric heating element comprising a frame, a transverse sheet metal bar on the frame, a plurality of upwardly extending spaced tongues on the bar, an electrical insulator of sheet material overlapping each tongue and provided with notches in opposite edge portions thereof interlocking projection and notch means on the insulator and bar to prevent shifting of the insulator on the bar and a loop of heating wire wrapped around and over the insulator engaged in the notches and holding the insulator against the bar and maintaining the notch and projection means in interlocked relation.

4. An electric heating element comprising a frame, a transverse sheet metal bar on the frame, a plurality of upwardly extending spaced tongues on the bar, an electric insulator of sheet material overlapping a tongue provided with notches in opposite edge portions thereof for receiving a loop of heating wire, wound therearound, and for insulating it from the tongue, a securing notch in an edge of the insulator, and a portion of the tongue extending thereinto to position the insulator on the bar and constituting the sole means to maintain the insulator against lateral shifting relative to the tongue.

5. An electric heating element comprising a frame, having a transversely extending angle form bar, one flange of the angle being cut away to provide a plurality of spaced tongues, a plurality of electric insulators of sheet material, resting on the other flange and one overlapping each tongue and provided with notches in opposite edges thereof for receiving a loop of heating wire wound therearound, and for insulating it from the tongue, and a securing notch in an edge of the insulator, and a portion of the tongue extending thereinto to position the insulator on the bar and constituting the sole means to maintain the insulator against lateral shifting relative to the tongue.

6. An electric heating element comprising a frame, a transverse sheet metal bar on the frame, a plurality of upwardly extending spaced tongues on the bar, an electric insulator of sheet material overlapping a tongue provided with notches in opposite edge portions thereof for receiving a loop of heating wire, wound therearound, and for insulating it from the tongue, a securing notch in an edge of the insulator, and a portion of the tongue extending thereinto to position the insulator laterally, and each insulator being held against a bar solely by the loop of wire therearound.

7. An electric heating element comprising a frame, having a transversely extending angleform bar, one flange of the angle being cut away to provide a plurality of spaced tongues, a plurality of electric insulators of sheet material, resting on the other flange and one overlapping each tongue and provided with notches in opposite edges thereof for receiving a loop of heating wire wound therearound, and for insulating it from the tongue, a securing notch in an edge of the insulator, and a portion of the tongue extending thereinto to position the insulator laterally, and each insulator being held against a bar solely by the loop of wire therearound.

CHRIST B. NELSON.